United States Patent
Rauch

[15] 3,635,077
[45] Jan. 18, 1972

[54] METHOD FOR MEASURING DEFORMATION AND GAUGE THEREFOR

[72] Inventor: Joseph Rauch, 8, impasse Truillot, 94 Ivry-sur-Seine, France

[22] Filed: July 30, 1969

[21] Appl. No.: 846,084

[30] Foreign Application Priority Data

Aug. 5, 1968 France....................161849

[52] U.S. Cl. .........................................73/88.5 R
[51] Int. Cl. ..............................................G01i 1/22
[58] Field of Search..........................73/88.5; 338/2, 114

[56] References Cited

UNITED STATES PATENTS

| | | | |
|---|---|---|---|
| 3,079,575 | 2/1963 | Singdale et al. | 73/88.5 X |
| 3,080,748 | 3/1963 | Burkley | 73/88.5 |
| 3,199,057 | 8/1965 | Gindes et al. | 73/88.5 X |
| 3,201,735 | 8/1965 | Brown et al. | 73/88.5 X |
| 3,509,942 | 5/1970 | Lindberg | 73/88.5 X |

Primary Examiner—James J. Gill
Attorney—McDougall, Hersh, Scott & Ladd

[57] ABSTRACT

A method of measuring deformation and an electrical resistance extensometer gauge therefor, wherein the gauge comprises a frame member having a surface adapted to be affixed to the surface of an article to be tested, at least one strand of wire which has an elastic memory, and means for affixing the strand to the frame member, whereby deformation of the article to be tested causes elongation of the strand thereby causing a change in the electrical resistance of said strand in proportion to the degree of deformation of the article to be tested.

4 Claims, 3 Drawing Figures

PATENTED JAN 18 1972  3,635,077

INVENTOR.
JOSEPH RAUCH
BY
McDougall, Hersh, Scott + Ladd
ATTYS.

METHOD FOR MEASURING DEFORMATION AND GAUGE THEREFOR

This invention relates to a method for measuring deformation and an irreversible extensometer gauge therefor, and more particularly to an extensometer having variable electrical resistance and a memory effect.

Resistance wire extensometer gauges which may be used to determine local stresses in articles subjected to certain forces in compression or tension are generally known to those skilled in the art. The stresses to which the article is subjected cause deformation of the article, which in turn causes deformation of the wire of the gauge affixed to the article whereby deformation of the wire of the gauge causes a change or variation in the electrical resistance of the wire. By measuring the variation in the electrical resistance of the wire, the deformation of the article as well as local stresses at the point at which the gauge is affixed to the article may be determined. In addition, such gauges may be used to determine the causes giving rise to the deformation of the article tested, such as variations in temperature or pressure.

Wires for use in such gauges usually comprise a metal having a high elastic limit whereby the wires return to their original length when the force applied to the article tested is removed. For this reason such gauges are generally referred to as being reversible, and give quite reliable results when measuring stresses which increase or decrease, even after a number of cycles in which the stresses are alternately applied and removed. However, such gauges cannot be used in applications where it is very difficult or impossible to measure the electrical resistance of the wire during deformation of the article studied, as is the case with articles inside pressurized tanks, articles in movement, such as projectiles or articles which are located in an environment hazardous to testing personnel. Reversible gauges are likewise unsuitable in applications where the article to be tested is subject to a very high degree of deformation in excess of the elastic limit of the wires, or where permanent connection of the gauge to registering instruments is unjustified.

It is accordingly an object of the present invention to provide an extensometer gauge which is characterized by a high degree of accuracy and which overcomes the foregoing disadvantages.

It is another object of the present invention to provide an extensometer gauge which is irreversible whereby the gauge exhibits a memory effect as to the maximum deformation of the article tested.

It is yet another object of the present invention to provide an electrical resistance extensometer gauge which is capable of use to determine deformation where electrical resistance cannot be measured during deformation.

These and other objects and advantages of the invention will hereinafter appear, and, for purposes of illustration, but not of limitation, embodiments of the invention are shown in the accompanying drawings, in which.

One of the principal concepts of the present invention resides in the use of a wire in an electrical resistance wire extensometer gauge which comprises a metal having an elastic memory whereby the wire retains elongation after the forces causing the elongation have been removed. Such wires are characterized by a very low elastic limit, such as an elastic limit of less than 3 hbar, or a very low degree of elongation in the elastic range, such as a relative elastic elongation of less than $500 \times 10^{-6}$. Wires of metals having these characteristics are subject to permanent elongation as soon as their elongation under tension exceeds a few ten-thousandths of their initial length whereby this permanent elongation remains after the forces applied to the wires have ceased to act thereon. The maximum elongation of the wire, and hence the maximum deformation of the article to which the gauge is affixed for testing, may be determined in accordance with methods known to those skilled in the art by measuring the change or variation in the electrical resistance of the gauge wire.

Metals having these characteristics which are suitable for use in the present invention are preferably pure metals in the annealed state such as gold, silver, lead, copper, and aluminum, as well as a variety of alloys of these metals having a low elastic limit.

Gauges embodying the features of the present invention may be produced by a variety of conventional methods for producing such gauges. It will be understood that the use of the term "wire" herein includes both round or flat wires having a small cross section as well as metal films formed by photoengraving or by mechanical procedures. It is generally preferred that the elastic limit of the metal comprising the wire be as low as possible in order to easily register low-limit elongation. In accordance with the preferred embodiment of the present invention, the gauge wires are produced from commercially pure aluminum in the annealed state.

In accordance with another concept of the present invention, the gauge wires are affixed to the gauge frame only at their ends, and not over their entire length, as has been the case in some extensometer gauges heretofore known in the art. The portions of the wires which are subject to elongation are free to move whereby the wires may retain permanent elongation without any change after the article to which the gauge is affixed has ceased to be subjected to deforming forces.

Figure 1:
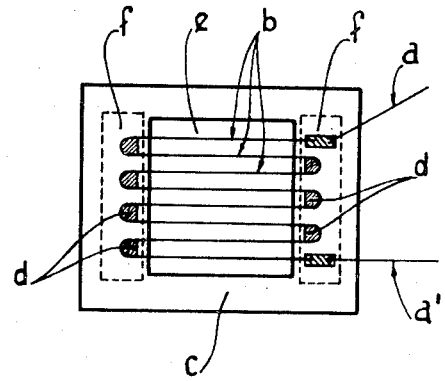
FIG. 1 is a top view of one embodiment of an electrical resistance extensometer gauge embodying the features of the present invention.

Referring now to the drawings, there is shown in FIG. 1 an embodiment of the present invention which is particularly well suited for use in determining elongation deformation of an article subjected to forces in tension. There is provided an integral frame member or carrier $c$, illustrated in FIG. 1 as being a flat plate having a rectangular configuration, and having a central recess or opening $e$. Positioned at opposite ends of central recess $e$ in a spaced relation on one surface of frame $c$ are means $d$ to affix at least one wire strand $b$ to the surface of frame member $c$. As shown in FIG. 1, means $d$ are reinforced ends of strands $b$, although it will be appreciated that various other means such as posts or the like may be used. Wire strands $b$ are affixed to frame member $c$ only at their respective ends $d$ and are otherwise free with respect to frame member $c$.

In accordance with a preferred embodiment of the invention, frame member $c$ is provided with a plurality of substantially parallel strands $b$, which are formed from a continuous wire element. At the ends of the continuous wire element are two terminals $a$ and $a'$.

The areas defined by the broken lines and designated as $f$ in FIG. 1 represent the other surface area of frame member $c$ which is adapted to be affixed to the surface of the article to be tested. It will be appreciated that, if desired, the entire surface area of frame member $c$ opposite strands $b$ may be affixed to the article to be tested.

In measuring elongation with the gauge embodying the features of this embodiment, the surface of frame $c$ opposite strands $b$ is affixed over its entire area, or, if desired, only in the area designated as $f$, to the article to be tested. As the article is subjected to forces in tension, strands $b$ are likewise subjected to the same forces in tension whereby the strands $b$ are permanently elongated, and retain their elongation after the forces applied to the article to be tested have been removed. The maximum elongation of the wire, and hence the maximum elongation of the article tested, can be determined from the permanent elongation of the wire strands by methods known to those skilled in the art. It will be appreciated that the article to be tested may be electrically insulated from wire strands $b$ extending across recess $e$ to prevent electrical contact between the gauge wire and the article if the article is electrically conductive.

Figure 2:
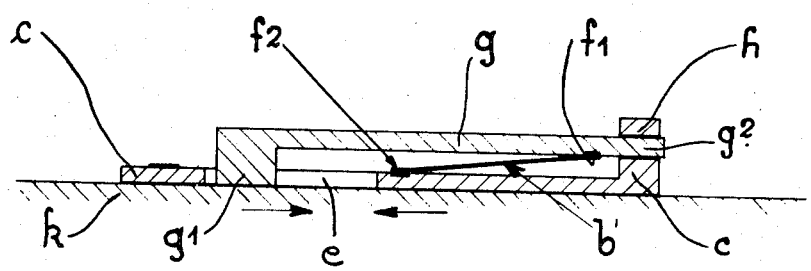
FIG. 2 is a sectional view of another embodiment according to the present invention taken along the line P—P of FIG. 3.
Figure 3:
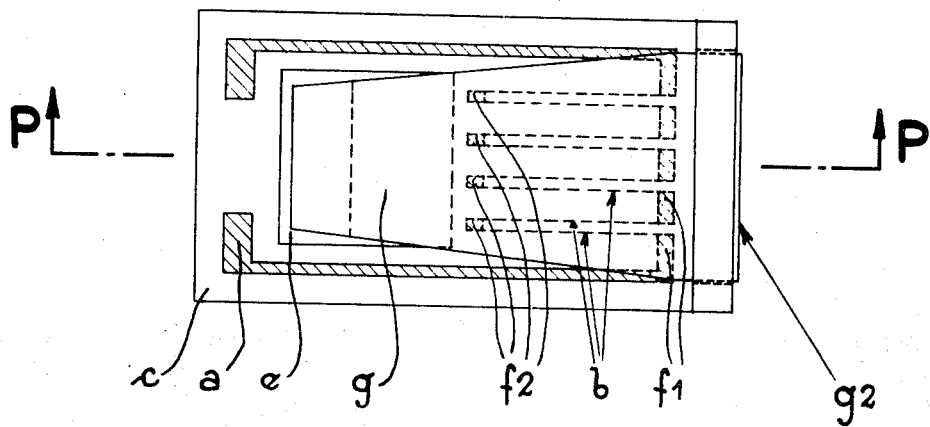
FIG. 3 is a plan view of another embodiment according to the present invention.

In FIGS. 2 and 3, there is disclosed an electrical resistance wire extensometer gauge embodying the features of another concept of the present invention. This embodiment is adapted to measure contraction when the article to be tested is subjected to forces in compression. The gauge of this embodiment is characterized by a carrier or frame comprising at least two parts, the first being fixed and the second being movable relative to the first, with the respective ends of the strands of wire being affixed to each of the two parts.

Referring specifically to FIG. 2, there is shown a carrier or frame member comprising a baseplate $c$ having a central recess $e$ and having at one end thereof a guide member $h$ which may be, if desired, integral with frame $c$. There is also provided a movable member $g$ which has an L-shaped cross section and which is movable relative to frame $c$. It will be observed that one end portion $g_1$ of movable member $g$ is adapted to be received by central recess $e$ of frame member $c$, and is adapted to be immovably affixed to the surface of the article $k$ to be tested. The opposite end portion $g_2$ of movable member $g$ is slidably engaged in a slot in guide member $h$ when frame member $c$ is in face-to-face parallel relation with movable member $g$.

The gauge wire comprises a continuous length having a plurality of parallel strands $b$, each of which are fixed at its one end to movable member $g$ at $f_1$ on the inner surface of movable member $g$, and fixed at its other end to the inner surface of frame member $c$ at $f_2$.

In order to test the properties of article $k$, the gauge is positioned on the surface of article $k$ with the outer surface of frame member $c$ and one end $g_1$ of movable member $g$ immovably affixed to the surface of article $k$. As article $k$ contracts when subjected to a force in compression, end portion $g_1$ of movable member $g$ is displaced in the direction of its opposite end $g_2$, while end portion $g_2$ slides in guide member $h$ to thereby exert a force in tension on wire strands $b$, and consequently cause strands $b$ to be permanently elongated in proportion to the degree of contraction of article $k$.

After the forces in compression have been removed from article $k$, measurement of the electrical resistance of strands $b$, which have been permanently elongated, permits the maximum amplitude of the contraction to be determined by known methods after the contraction has ceased.

Using gauges embodying the features of the present invention it is possible to measure deformation which occurs due to a variation in temperature. When undertaking this type of measurement, the nature of the metal of the gauge wire should be selected so that the gauge wire is always subject to elongation. For this to be possible, the coefficient of thermal expansion must differ from that of the article to be tested. As will be appreciated, to measure expansion, gauges of the type illustrated in FIG. 1 are normally used and the coefficient of expansion of the gauge wire is selected so as to be less than the coefficient of expansion of the article to be tested. In order to measure contraction, gauges of the type illustrated in FIGS. 2 and 3 are used and the coefficient of expansion of gauge wire is greater than the coefficient of expansion of the article to be tested.

The following example is provided by way of illustration, and not by way of limitation, to illustrate the concepts of the present invention.

There is provided a gauge wire consisting essentially of 99.6 percent pure aluminum in the annealed state, and having a rectangular cross section of 0.02 mm. by 1 mm., and an initial length (L) of 0.5 m. This wire is progressively elongated by forces in tension, with the elongation (dL) of the extended wire being measured at each stage of the elongation. In addition, at each stage, the forces in tension are removed in order to measure the corresponding electrical resistance (R).

It is found that the relative elongation (dL/L), determined after release of the forces in tension, exceeds the comparatively low value of $300 \times 10^{-6}$, there remains a residual variation in the electrical resistance of the gauge wire. By progressively increasing the relative elongation (dL/L) beyond $300 \times 10^{-6}$ to a value of $40,000 \times 10^{-}$, at which point the wire breaks, it is found that the variation in resistance (dR/R) is proportional to the relative elongation (dL/L). Thus, an experimental curve of the data thus obtained closely approximates a straight line, having the equation (dR/R)=1.6 (dL/L–$300 \times 10^{-6}$).

Thus, it will be apparent that this curve may be used to determine the maximum relative elongation (dL/L) of any gauge having an identical wire and subjected to an unknown degree of elongation by measuring the electrical resistance of the wires after the forces acting upon the wires have been removed. It will also be appreciated that it is possible to determine various details as to local stresses, temperatures, and extreme pressures to which the article has been subjected from the value of the relative elongation (dL/L).

It will be understood that I have provided a very reliable yet simple method for determining deformation, and a gauge to be used therefor, which can be readily used in applications where it is not possible to measure electrical resistance of the gauge wire while the article to be tested is undergoing deformation.

It will be understood that various changes may be made in the details of construction and method of operation without departing from the spirit of the invention, especially as defined in the following claims.

I claim:

1. A method for determining deformation in an article comprising providing an extensometer gauge including a frame member having at least one surface, said surface being adapted to be affixed to said article, at least one strand having two end portions and having an elastic memory, and means for affixing said end portions to said frame member; affixing at least part of said surface to a surface of said article; causing said article to be deformed whereby deformation of said article causes elongation of said strand in proportion to the deformation of said article and beyond the elastic limit of said strand; and measuring the change in electrical resistance of said strand caused by elongation.

2. A method as defined in claim 1 wherein the change in electrical resistance in said strand is measured after said article has been deformed.

3. A method as defined in claim 1 wherein said strand has an elastic limit less than 3 hbar.

4. A method as defined in claim 1 wherein said strand has a relative elastic elongation of less than $500 \times 10^{-6}$.

* * * * *

UNITED STATES PATENT OFFICE
CERTIFICATE OF CORRECTION

Patent No. 3,635,077         Dated January 18, 1972

Inventor(s) Joseph Rauch

It is certified that error appears in the above-identified patent and that said Letters Patent are hereby corrected as shown below:

On the cover sheet, insert -- [73] Assignee:

Compagnie Pechiney, Paris, France --.

Signed and sealed this 1st day of May 1973.

(SEAL)
Attest:

EDWARD M. FLETCHER, JR.            ROBERT GOTTSCHALK
Attesting Officer                  Commissioner of Patents